United States Patent [19]
Ikuma

[11] Patent Number: 5,297,116
[45] Date of Patent: Mar. 22, 1994

[54] OPTICAL INFORMATION RECORDING/REPRODUCTION APPARATUS WHICH COOLS COMPONENTS WITHOUT ADVERSELY AFFECTING OPERATING EFFICIENCY

[75] Inventor: Susumu Ikuma, Tokyo, Japan

[73] Assignee: Canon Kabushiki Kaisha, Tokyo, Japan

[21] Appl. No.: 724,135

[22] Filed: Jul. 1, 1991

[30] Foreign Application Priority Data

Jul. 3, 1990 [JP] Japan .................. 2-174436

[51] Int. Cl.$^5$ .......................................... G11B 33/02
[52] U.S. Cl. ..................................... 369/75.1; 369/13
[58] Field of Search ............... 369/32, 75.1, 75.2, 369/71, 72, 13; 360/97.2, 98.3

[56] References Cited

U.S. PATENT DOCUMENTS

| | | | |
|---|---|---|---|
| 4,732,017 | 3/1988 | Nakayama | 68/150 |
| 4,771,412 | 9/1988 | Aihara et al. | 369/75.1 |
| 4,870,636 | 9/1989 | Yamamoto | 369/71 |
| 4,979,062 | 12/1990 | Stefansky et al. | 360/97.2 |
| 5,031,059 | 7/1991 | Yamaguchi et al. | 360/97.03 |
| 5,043,969 | 8/1991 | Carey et al. | 369/75.1 |
| 5,058,097 | 10/1991 | Suzuki | 369/75.1 |
| 5,081,551 | 1/1992 | Aruga | 360/97.2 |
| 5,086,422 | 2/1992 | Hagiya et al. | 369/75.1 |
| 5,097,366 | 3/1992 | Ueki et al. | 360/97.2 |

FOREIGN PATENT DOCUMENTS

| | | | |
|---|---|---|---|
| 3630786 | 7/1988 | Fed. Rep. of Germany . | |
| 58-41466 | 3/1983 | Japan | 369/75.1 |
| 61-269285 | 11/1986 | Japan | 369/97.02 |

OTHER PUBLICATIONS

Patent Abstracts of Japan, Kokai No. 63-96791, vol. 12, No. 334, Sep. 1988.
Patent Abstracts of Japan, Kokai No. 63-292482, vol. 13, No. 120, Mar. 1989.
Patent Abstracts of Japan, Kokai No. 1-116989, vol. 13, No. 358, Aug. 1989.

*Primary Examiner*—Aristotelis Psitos
*Assistant Examiner*—Nabil Hindi
*Attorney, Agent, or Firm*—Fitzpatrick, Cella, Harper & Scinto

[57] ABSTRACT

Disclosed is an apparatus for recording information on and/or reproducing information from a disk-like recording medium with a light beam. The apparatus includes a box-like casing in which are provided a rotary drive mechanism for rotating the recording medium, an optical head having a movable portion on which at least an objective lens is mounted and a fixed portion on which at least the light source for emitting the light beam and a detector for detecting light reflected by the recording medium are mounted, and an electric circuit board having at least a control circuit for controlling the conditions of irradiation of the recording medium with the light beam and the movement of the optical head. Shielding plates are provided to separate the recording medium and the movable portion of the optical head from the rotary drive mechanism, the electric circuit board and the fixed portion of the optical head, and a cooling fan is also provided to cool the rotary drive mechanism, the electric circuit board and the fixed portion of the optical head.

15 Claims, 6 Drawing Sheets

OPTICAL INFORMATION RECORDING/REPRODUCTION APPARATUS WHICH COOLS COMPONENTS WITHOUT ADVERSELY AFFECTING OPERATING EFFICIENCY

BACKGROUND OF THE INVENTION

1. Field of the Invention

This invention relates to an optical information recording/reproduction apparatus for optically recording and reproducing information by using a light beam.

2. Description of the Prior Art

An optical information recording/reproduction apparatus is capable of recording information based on a reduced size of a light spot formed on a recording medium by irradiating the recording medium with a light beam through an optical system and is therefore advantageous in increasing the recording density. A conventional apparatus of this kind constructed as an optomagnetic information recording/reproduction apparatus will be described below.

Figure 1:
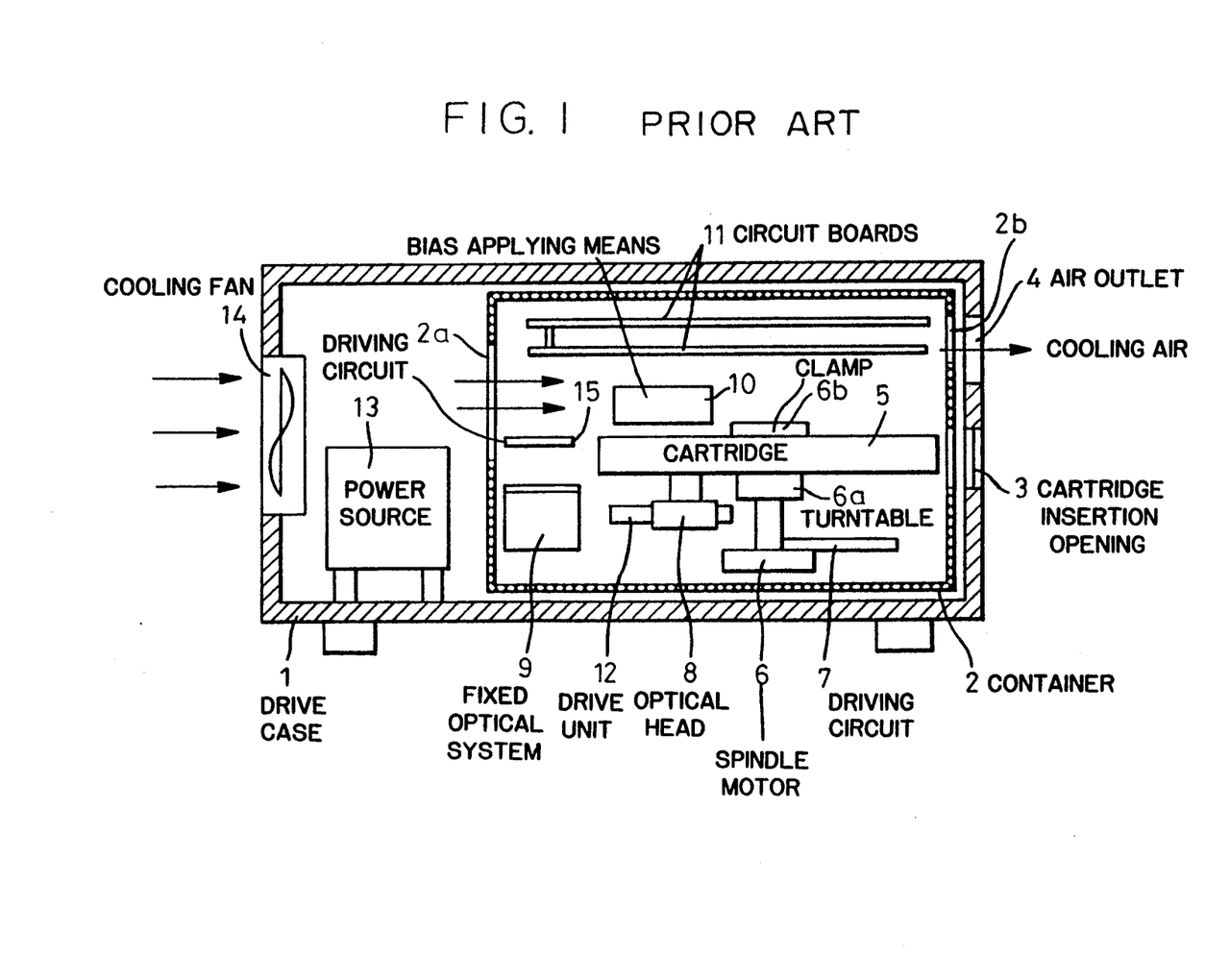
FIG. 1 is a cross-sectional view of the construction of a conventional optical information recording/reproduction apparatus.
Figure 2:
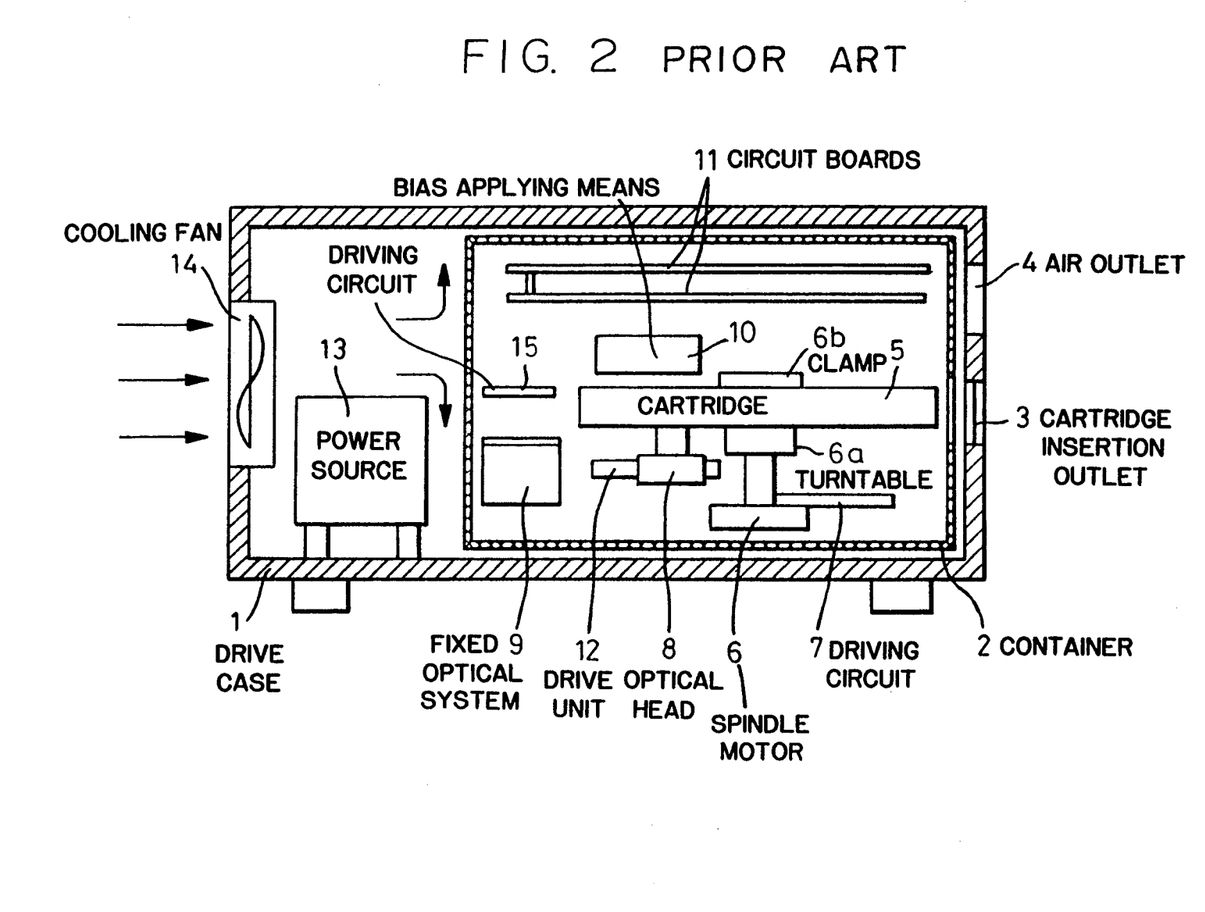
FIG. 2 is a cross-sectional view of the construction of another conventional optical information recording/reproduction apparatus.

As shown in FIGS. 1 and 2, a conventional optical information recording/reproduction apparatus has a cartridge insertion opening 3 which can be closed by a shutter and which is formed in a portion of a drive case 1. A disk cartridge 5 including a recording medium is inserted into or ejected out of the drive case 1 through the opening 3. A spindle motor 6 and a turntable 6a driven by the spindle motor 6 are provided in the drive case 1 to rotate the disk cartridge 5 at a constant speed. The disk cartridge 5 is fixed on the turntable 6a by a clamp means 6b such as a magnetic clamp. An optical head 8 for recording/reproducing information is disposed in the drive case 1. The optical head 8 is operated and controlled by a drive unit 12 moved in a radial direction of the recording medium. An optical system of such an apparatus includes a movable optical system provided on the optical head 8, and is constituted by an objective lens and a movable mirror (not shown). The optical system also includes a fixed optical system 9 which includes a laser provided as a light source and a detector (not shown) for detecting light reflected from the recording medium, and which is fixedly disposed on the apparatus opposite to the movable optical system. A magnetic field bias applying means 10 for applying a magnetic field bias to the recording medium is also provided in the drive case 1. The magnetic field bias applying means 10 applies a recording or erasing basing magnetic field to the recording medium at a position where the recording medium is irradiated with a light beam from the optical head 8. In the drive case 1 are further provided electric circuit boards including printed control circuit boards 11 on which are formed a circuit 7 for driving the spindle motor 6, a circuit (not shown) for controlling the magnetic field bias applying means 10 which opposes the optical head 8, a servo circuit (not shown) for controlling the state (e.g., tracking or focusing) of the light beam emitted from the optical head 8 and other circuits, and a circuit 15 for driving the optical head 8.

As shown in FIGS. 1 and 2, these components are housed as a unit in a container 2 placed in the drive case 1. The container 2 is supported on the drive case 1 by a vibration damping mechanism (not shown). A power source 13 for driving the above-noted components is separately provided in the drive case 1. A cooling fan 14 is provided on the drive case 1 to introduce air for cooling the power source 13 and then for directly cooling heating members as desired while causing air to flow to an air outlet 4 through ventilation openings 2a and 2b formed in walls of the container 2, as shown in FIG. 1, or the air directly cools the power source 13 after being introduced by the cooling fan 14, and indirectly cools the heating members in the container 2 by cooling outside walls of the container 2 while flowing through gaps between the container 2 and the drive case 1, as shown in FIG. 2. This cooling is intended to prevent damage to the information on the recording medium or deterioration of the performance of each of the semiconductor lasers serving as light sources and other electric parts due to an increase in the temperature in the drive case 1 or in the container 2 caused by the heat from the heating members in the container 2 of the apparatus.

In the former of these arrangements, as shown in FIG. 1, the heating members can be cooled by the cooling air introduced into the container 2, but there is a risk that any dust contained in the air will adhere to the optical system of the optical head and to the surface of the recording medium and, hence, will hinder correctly recording or reproducing information. In the case of the latter of these arrangements, as shown in FIG. 2, the heat sources, i.e., the spindle motor, the drive circuit, the light source of the fixed optical system, the printed control circuit board, and so on cannot be cooled sufficiently.

It is essential to efficiently cool the spindle motor, the drive circuit (for the light source and the spindle motor) and the printed control circuit boards, which are the primary heat sources.

SUMMARY OF THE INVENTION

In view of the above-described problems, an object of the present invention is to provide an optical information recording/reproduction apparatus capable of efficiently cooling the heating members in the drive case while preventing the cooling air from contaminating the recording medium and the optical system of the optical head.

To achieve this object, according to the present invention, there is provided an optical information recording/reproducing apparatus having a box-like casing containing a rotary drive mechanism for rotating a disk-like optical recording medium, an optical head for emitting a light beam to irradiate the recording medium rotated by the rotary drive mechanism to record information on and/or reproduce information from the recording medium, and an electric circuit board having at least a control circuit for controlling the conditions of irradiation of the recording medium with the light beam emitted from the optical head and the movement of the optical head. The apparatus comprises shielding plate means for separating the recording medium and the optical head from the rotary drive mechanism and the electric circuit board and cooling means for cooling the rotary drive mechanism and the electric circuit board separated by the shielding plate means. The optical information recording/reproduction apparatus of the present invention also can include a bias magnetic field application means for applying a bias magnetic field to the recording medium at a position where the recording medium is irradiated with the light beam. In which case, the shielding plate means is for separating the recording medium and the optical head from the rotary drive mechanism, the electric circuit board and the bias magnetic field application means, and the cooling means is for cooling the rotary drive mechanism, the electric circuit board and the bias magnetic field application means separated by the shielding plate means.

To achieve the above-noted object, according to the present invention, there also is provided an optical information recording/reproduction apparatus having a box-like casing containing a rotary drive mechanism for rotating a disk-like optical recording medium, an optical head for emitting a light beam for recording information on and/or reproducing information from the recording medium rotated by the rotary drive mechanism, the optical head having a movable portion on which at least an objective lens is mounted and a fixed portion on which are mounted at least the light source for emitting the light beam to irradiate the recording medium and a detector for detecting light reflected by the recording medium, and an electric circuit board having at least a control circuit for controlling the conditions of irradiation of the recording medium with the light beam emitted from the optical head and the movement of the optical head, the apparatus comprising shielding plate means for separating the recording medium and the movable portion of the optical head from the rotary drive mechanism, the electric circuit board and the fixed portion of the optical head, and means for cooling the rotary drive mechanism, the electric circuit board and the fixed portion of the optical head separated by the shielding plate means.

The optical information recording/reproducing apparatus also can include a bias magnetic field application means for applying a bias magnetic field to the recording medium at a position where the recording medium is irradiated with the light beam. In which case, the shielding plate means is for separating the recording medium and the movable portion of the optical head from the rotary drive mechanism, the electric circuit board and the fixed portion of the optical head, and the cooling means is for cooling the rotary drive mechanism, the electric circuit board and the fixed portion of the optical head separated by the shielding plate means.

To achieve the above-noted object, according to the present invention, there is also provided an optical information recording/reproduction apparatus for recording information on and/or reproducing information from a recording medium with a light beam. The apparatus comprises a cooling fan for supplying cooling air for cooling members which generate heat contained within said apparatus, and a partition wall for covering the recording medium and an optical system in the apparatus from air flow supplied by said cooling fan.

DESCRIPTION OF THE PREFERRED EMBODIMENTS

Embodiments of the present invention will be described below in detail with reference to the accompanying drawings. Components in the embodiments are the same as components in the conventional apparatus which are indicated by the same reference characters, and description of these components will not be repeated.

Figure 3:
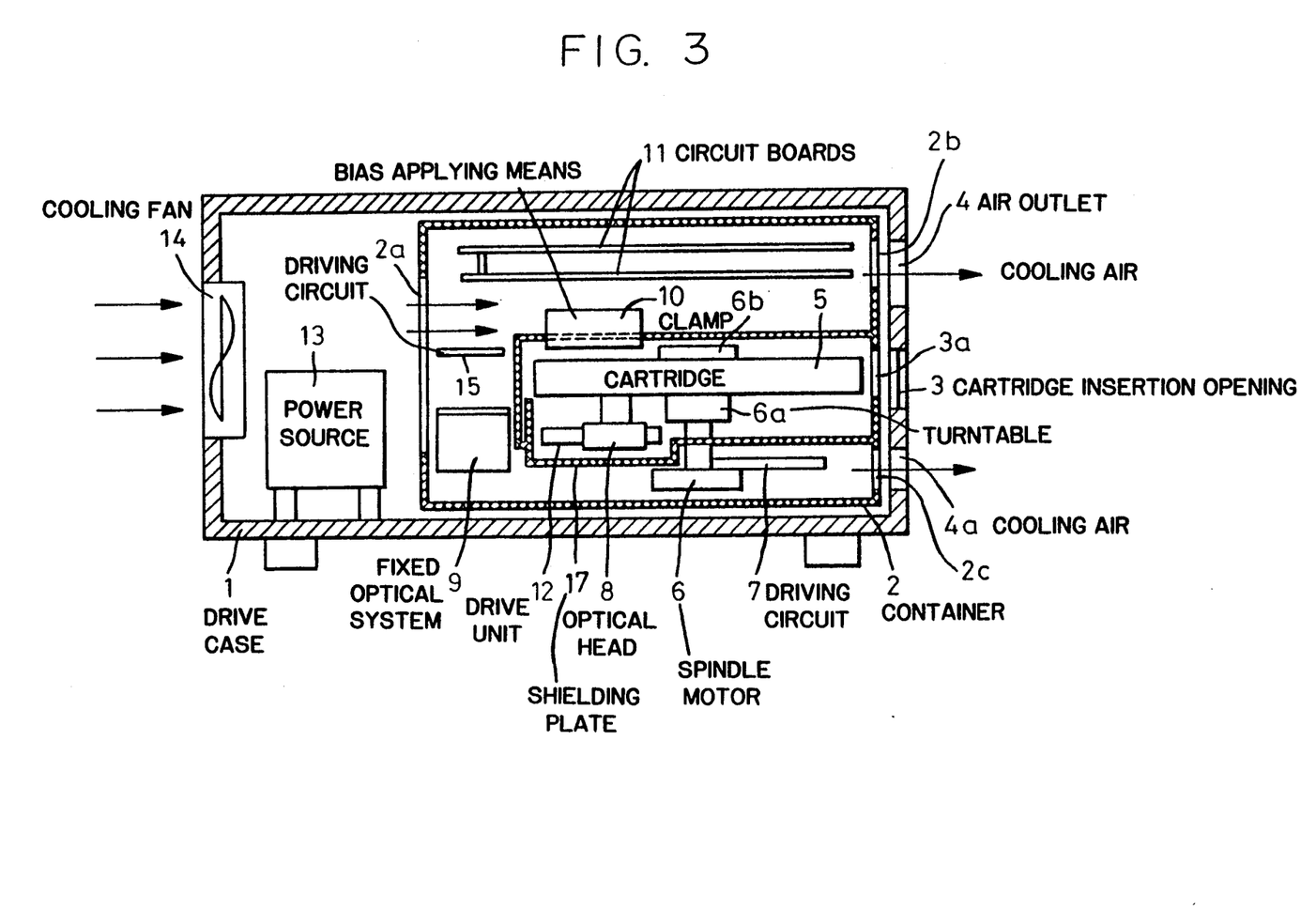
FIG. 3 is a cross-sectional view of the construction of an optical information recording/reproduction apparatus in accordance with a first embodiment of the present invention.

In the first embodiment shown in FIG. 3, ventilation openings 2b and 2c are formed in walls of a container 2, as in the case of the conventional apparatus. A recording medium 5, a portion of a magnetic field bias applying means 10 (of the electromagnet type), a turntable 6a for supporting a disk cartridge 5, a clamping device 6b for clamping the disk cartridge 5, an optical head 8 on which a movable optical system is mounted, and a drive unit 12 for driving the optical head 8, i.e., non-heating members and components to be prevented from being contaminated or damaged by dust (the recording medium, the movable optical system) are surrounded by a side wall of the container 2 and partition walls 17 which integrally form a box-like casing, whereby the above components are isolated from air flow introduced into the container 2. Partition wall 17 can provide shielding plate means for separating the recording medium 5 and the optical head 8 from the rotary drive mechanism 6 and the electric circuit board 11. Although the magnetic field bias applying means 10 is a heating component, a portion of it is positioned inside the partition walls 17 in order to apply a biasing magnetic field to the recording medium at a suitable efficiency. However, the degree of heating of the magnetic field bias applying means 10 is small in comparison with other heating components, and the magnetic field bias applying means is not easily damaged by thermal influence. Therefore, no serious problems arise even if the entire magnetic field bias applying means is placed inside the partition walls. The drive unit 12 for driving the optical head 8 and an automatic focusing actuator (not shown) or the like are heating components, but can be provided inside the partition walls without creating any serious problems, since the amounts of heating thereof are small. Thus, unlike the conventional apparatus, the arrangement of the present invention is such that the recording medium, the members supporting the recording medium and the movable optical system of the optical head are isolated from other components in the container 2 (the fixed optical system of the optical head, the spindle motor, the drive circuit for the same, the laser drive circuit, the printed control circuit board, the other portion of the magnetic field bias applying means, and so on) by structural means, while cooling air directly blows against the heat sources. Effective cooling is thereby achieved while avoiding dust contamination. Occurrence of local thermal damage also can be avoided.

Figure 4:
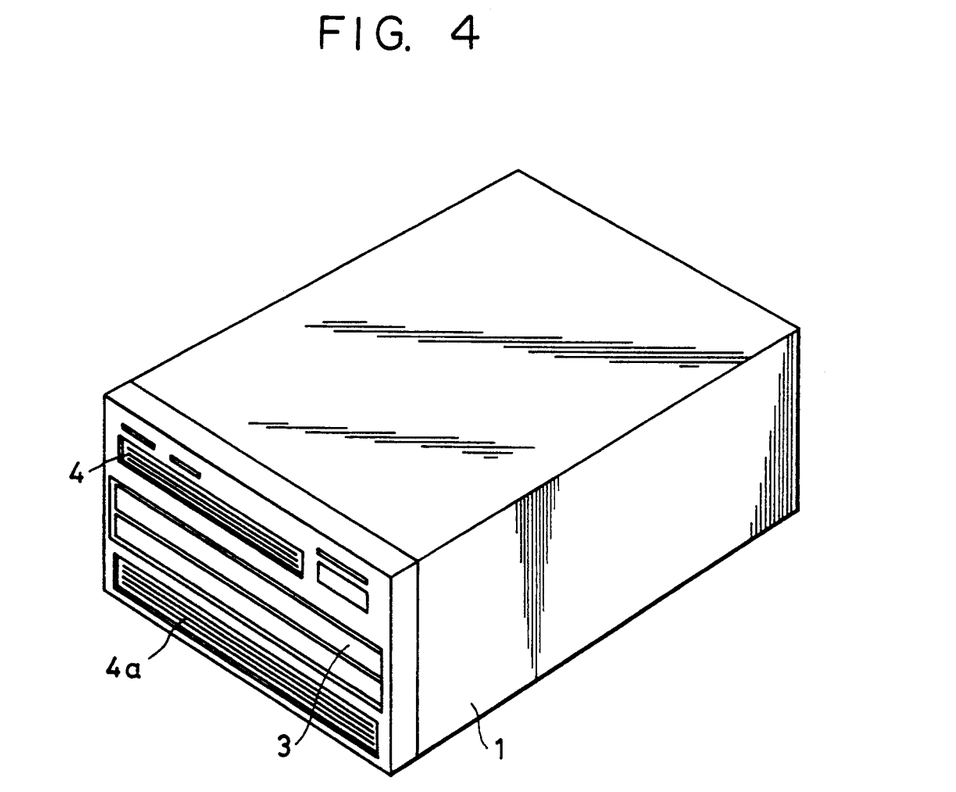
FIG. 4 is a perspective view of the exterior appearance of the apparatus shown in FIG. 3.

In the above-described embodiment, to effectively ventilate the interior of the container 2, a ventilation opening 2c is formed in a wall of the container 2 while a ventilation opening 4a (FIG. 4) is formed in the drive case 1. Air flows as indicated by the arrows in FIG. 3.

Figure 5:
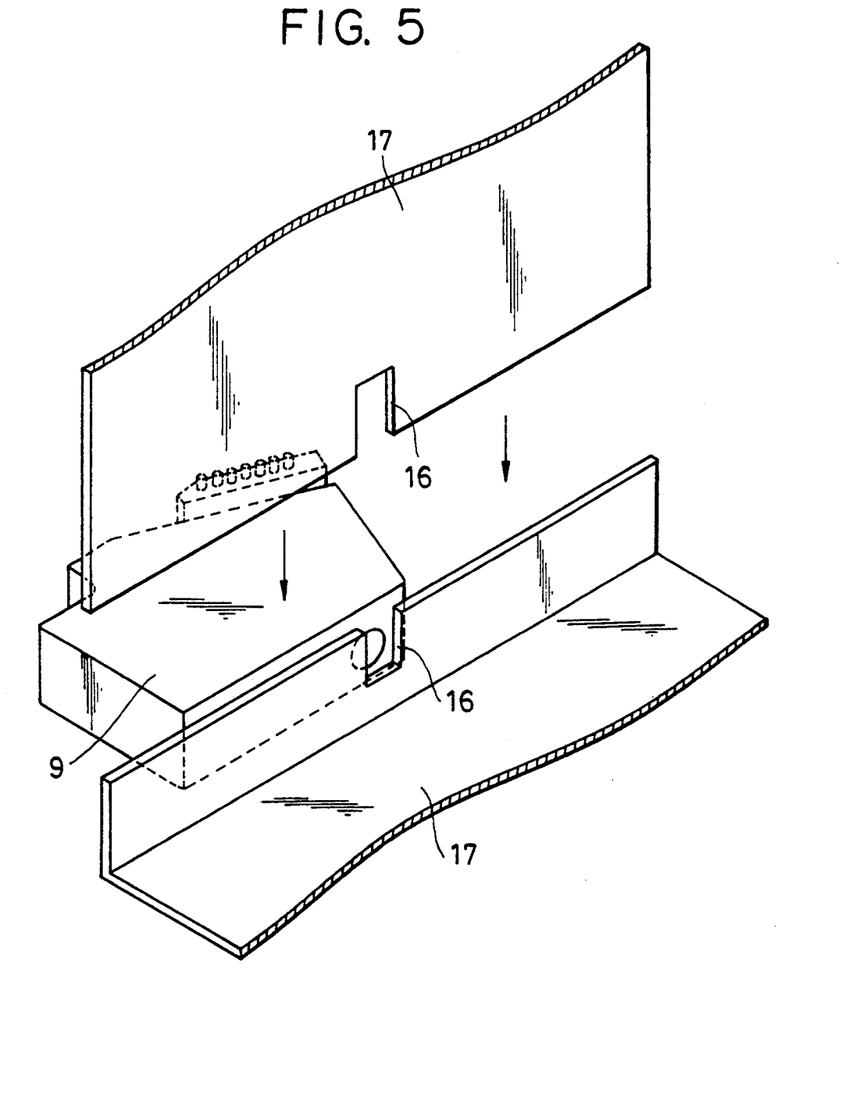
FIG. 5 is a detailed perspective view of portions of the partition walls of the apparatus shown in FIG. 3.

In the above-described embodiment, an opening through which an optical path extends from the fixed optical system 9 to the movable optical system is defined by cuts or notches 16 in the partition walls 17, as shown in FIG. 5.

To enable the recording medium to be inserted or withdrawn, the space surrounded by the partition walls 17 and the side wall of the container 2 is accessible to the outside through an opening 3a which is formed in the side wall of the container 2 and which faces insertion opening 3 of the drive case 1.

Figure 6:
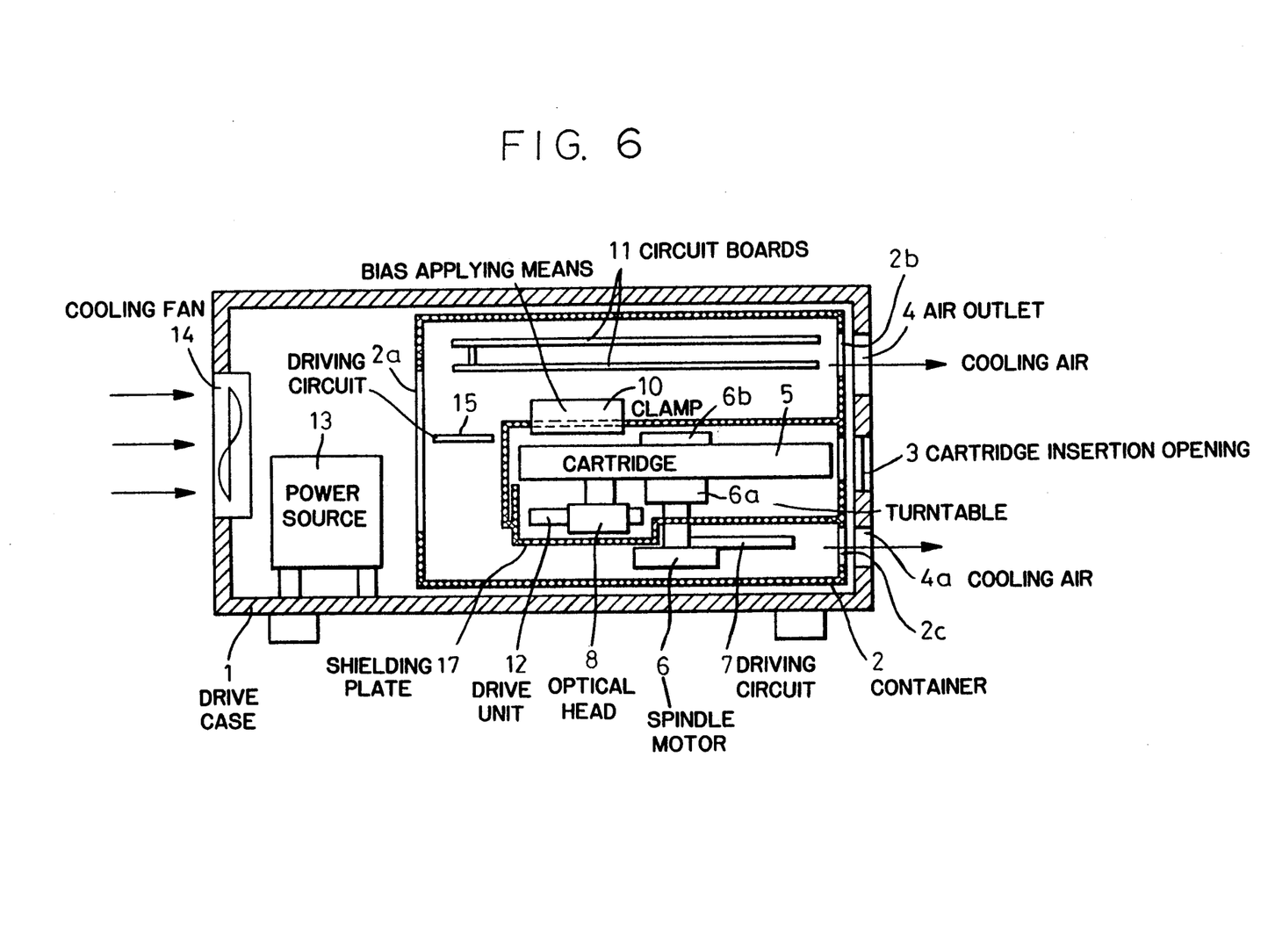
FIG. 6 is a cross-sectional view of the construction of an optical information recording/reproduction apparatus in accordance with a second embodiment of the present invention.

The optical head of the above-described embodiment is of a separate type in that the fixed portion and the movable portion of the optical head are separate components. However, the present invention also can be applied to apparatuses using an integral type optical head (such that a laser light source and a detector are integrally movable with the optical head 8) as shown in FIG. 6. In this embodiment, the partition wall 17 can provide shielding plate means for separating the recording medium 5 and the entire optical head 8 from the rotary drive mechanism 6, the electric circuit board 11 and the bias magnetic field application means 10.

In accordance with the present invention, as described above in detail, components or members apt to be damaged by dust are covered with partition walls while air directly blows against the members which generate heat. It is thereby possible to protect portions of the optical system and so on so as to be covered from dust, as well as to protect the printed control circuit board, the spindle motor, the light source, and so on from being thermally damaged.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical information recording/reproduction apparatus having a box-like casing containing a rotary drive mechanism for rotating a disk-like optical recording medium, an optical head for emitting a laser beam for recording information on and/or reproducing information from the recording medium rotated by the rotary drive mechanism, the optical head having a movable portion on which at least an objective lens is mounted and a fixed portion on which are mounted at least a laser source for emitting the laser beam and a detector for detecting light reflected by the recording medium, and an electric circuit board having at least a control circuit for controlling the laser source and a control circuit for controlling the movement of the movable portion of the optical head, said apparatus comprising:

shielding plate means for separating the recording medium and the movable portion of the optical head from the rotary drive mechanism, the electric circuit board and the fixed portion of the optical head; and cooling means for cooling the rotary drive mechanism, the electric circuit board and the fixed portion of the optical head separated from the recording medium and the movable portion of the optical head by said shielding plate means.

2. An apparatus according to claim 1, wherein said cooling means comprises a cooling fan for supplying cooling air to cool the rotary drive mechanism, the electric circuit board and the fixed portion of the optical head.

3. An apparatus according to claim 2, wherein said rotary drive mechanism comprises a spindle motor.

4. An apparatus according to claim 2, wherein said shielding plate means comprises means for preventing any dust entrained in the cooling air from attaching to the recording medium and the optical system of the optical head.

5. An apparatus according to claim 1, wherein said shielding plate means comprises means for covering the optical head and the recording medium and includes an opening through which the recording medium is inserted and withdrawn.

6. An optical information recording/reproduction apparatus having a box-like casing containing a rotary drive mechanism for rotating a disk-like opto-magnetic recording medium, an optical head having a laser source for emitting a laser beam to irradiate the recording medium rotated by the rotary drive mechanism to record information on and/or reproduce information from the recording medium, a bias magnetic field application means for applying a bias magnetic field to the recording medium at a position where the recording medium is irradiated with the laser beam, and an electric circuit board having at least a control circuit for controlling the laser source and a control circuit for controlling the movement of the optical head, said apparatus comprising:

shielding plate means for separating the recording medium and the optical head from the rotary drive mechanism, the electric circuit board and a portion of the bias magnetic field application means; and cooling means for cooling the rotary drive mechanism, the electric circuit board and the portion of the bias magnetic field application means separated from the recording medium and the optical head by said shielding plate means.

7. An apparatus according to claim 6, wherein said cooling means comprises a cooling fan for supplying cooling air to cool the rotary drive mechanism, the electric circuit board and the portion of the bias magnetic field application means.

8. An apparatus according to claim 7, wherein said rotary drive mechanism comprises a spindle motor.

9. An apparatus according to claim 7, wherein said shielding plate means comprises means for preventing any dust entrained in the cooling air from attaching to the recording medium and the optical system of the optical head.

10. An apparatus according to claim 6, wherein said shielding plate means comprises means for covering the optical head and the recording medium and includes an opening through which the recording medium is inserted and withdrawn.

11. An optical information recording/reproduction apparatus having a box-like casing containing a rotary drive mechanism for rotating a disk-like opto-magnetic recording medium, an optical head for emitting a laser beam for recording information on and/or reproducing information from the recording medium rotated by the rotary drive mechanism, the optical head having a movable portion on which at least an objective lens is mounted and a fixed portion on which are mounted at least a laser source for emitting the laser beam and a detector for detecting light reflected by the recording medium, a bias magnetic field application means for applying a bias magnetic field to the recording medium at the position where the recording medium is irradiated with the laser beam, and an electric circuit board having at least a control circuit for controlling the laser source and a control circuit for controlling the movement of the movable portion of the optical head, said apparatus comprising:

shielding plate means for separating the recording medium and the movable portion of the optical head from the rotary drive mechanism, the electric circuit board, the fixed portion of the optical head and a portion of the bias magnetic field application means; and cooling means for cooling the rotary drive mechanism, the electric circuit board, the fixed portion of the optical head and the portion of the bias magnetic field application means separated from the recording medium and the movable portion of the optical head by said shielding plate means.

12. An apparatus according to claim 11, wherein said cooling means comprises a cooling fan for supplying cooling air to cool the rotary drive mechanism, the electric circuit board, the fixed portion of the optical head and the portion of the bias magnetic field application means.

13. An apparatus according to claim 12, wherein said rotary drive mechanism comprises a spindle motor.

14. An apparatus according to claim 12, wherein said shielding plate means comprises means for preventing any dust entrained in the cooling air from attaching to the recording medium and the optical system of the optical head.

15. An apparatus according to claim 11, wherein said shielding plate means comprises means for covering the optical head and the recording medium and includes an opening through which the recording medium is inserted and withdrawn.

* * * * *